UNITED STATES PATENT OFFICE.

ALFRED EVERARD MACINDOE, OF AUCKLAND, NEW ZEALAND.

PACKING-HOLDER FOR PISTON-RODS.

SPECIFICATION forming part of Letters Patent No. 706,976, dated August 12, 1902.

Application filed July 29, 1901. Serial No. 70,130. (No model.)

*To all whom it may concern:*

Be it known that I, ALFRED EVERARD MACINDOE, engineer, a subject of His Majesty the King of the United Kingdom of Great Britain and Ireland, residing at the city of Auckland, in the Provincial District of Auckland and Colony of New Zealand, have invented a certain new and useful Packing-Holder for Piston-Rods, Shafts, and Such Like of Engines that Require Packing, of which the following is a specification.

This invention is intended to provide a ready means of removing packing from around piston-rods, shafts, and such like to reduce the space required for packing and for the use of smaller packing.

It consists in having a packing-holder made to move onto and fit on the piston rod or shaft and to fit into the stuffing-box now used, so that on the gland being lifted off or removed it (the packing-holder) can be raised and opened out, whereby the packing can be easily and expeditiously taken off and from the piston rod or shaft.

The accompanying drawings show three figures, of which—

Figure 1:
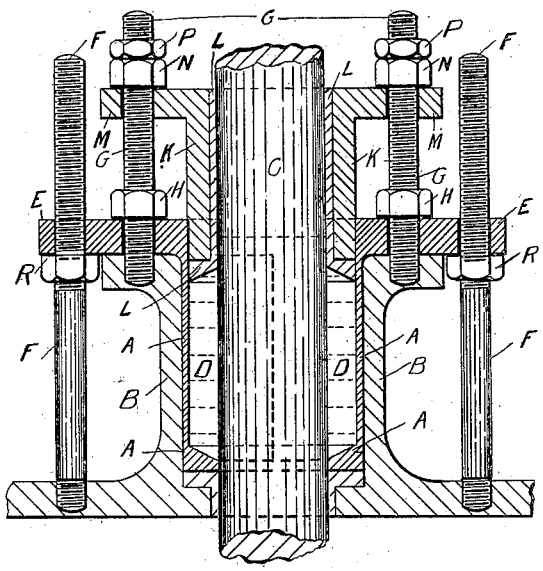
Figure 2:
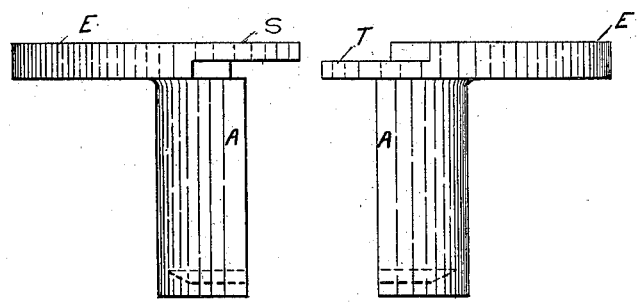
Figure 3:
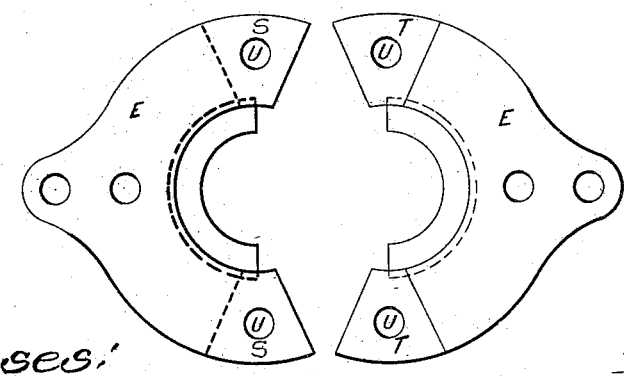

Figure 1 is a section showing the gland and stuffing-box, with the packing-holder and packing therein and piston-rod. Fig. 2 is an elevation of the packing-holder opened out, and Fig. 3 is a plan of the packing-holder opened out.

To put the invention into use, it (the packing-holder A) in two sections or parts is let into the stuffing-box B on or over the piston-rod C, and the flange E of the holder is at the same time passed over the screws F and G and checked in at S and T by the screws or bolts U. Then the nuts H are screwed downwardly on the screws G close on the flange E, and so keep the holder A tightly held to and in the stuffing-box B, whereupon the packing D is packed into the holder A in the usual way. The gland K and sleeve L are then passed over the rod C, and the flange M of the gland K is passed over the screw G in the usual way, and the nuts N are screwed downwardly on the screws G close onto the flange M, and thereby keep the gland K and sleeve L evenly adjusted to the rod C. Lock-nuts P are screwed downwardly on the screws G over the nuts N and further help to keep the gland K and sleeve L securely in place.

When it is desired to take out or to remove the packing D for any purpose, the lock-nuts P and nuts N are unscrewed from the screws G, when the gland K and sleeve L are lifted off the screws G. This being done, the nuts H are unscrewed from the screws G, and the nuts R, fitted to the screws F beneath the flange E, are screwed upwardly, whereby the holder A is lifted up from the top of the stuffing-box B, and it carries with it the packing D up the rod until the bottom of the holder A is above the stuffing-box B and in the position that the gland K was before it was removed, when the bolts or screws U, holding the flange E checked in at S and T, are removed, and the parts of the holder A are separated, as shown in Figs. 2 and 3, so that the packing D adhering to the rod C can be easily and expeditiously stripped from it without in any way damaging either the packing D or the rod C.

The screws F are specially provided for the flange E to pass over when the holder A is being fitted in the stuffing-box B and also so that by the upward screw of the nuts R the holder A can be lifted out of and away from the stuffing-box B, as before described. The holder A may also be removed by tapping holes in the flange E and screwing studs against the face of the stuffing-box B as an alternative method to the use of the screws F and nuts R; but this alternative method is not claimed.

The side of the holder A fitting into the stuffing-box B can, if thought fit, be made thicker than is shown in Fig. 1, so as to reduce the space required for the packing D, and smaller packing can also be made use of, whereby the cost and quantity of the packing used will be materially reduced; but this is optional and need not be done unless so desired. The shape of the bottom of the holder A can be varied, as it may be found more advantageous to have it square or otherwise shaped in some instances than in the form shown in the drawings, including dispensing with the lip.

The holder A and its screws, nuts, and all parts can be made of any suitable metal.

Having fully described my invention, what I desire to claim and secure by Letters Patent is—

In combination the packing-holder in parts fitted into the stuffing-box around the piston-rod with the flange of each part bored to pass over screws and kept in position by nuts, nuts for securing said packing-holder to said stuffing-box, screws and nuts for lifting said packing-holder above said stuffing-box, means for checking in and separating parts of said packing-holder, gland and sleeve for fitting over said packing-holder and said stuffing-box, and nuts for securing said gland and sleeve all for the purpose set forth substantially as described and illustrated.

ALFRED EVERARD MACINDOE.

Witnesses:
GEORGE WILLIAM BASLEY,
PERCY HERBERT BASLEY.